United States Patent
Tenorio et al.

(10) Patent No.: US 7,263,515 B1
(45) Date of Patent: Aug. 28, 2007

(54) CONTENT ENHANCEMENT IN AN ELECTRONIC MARKETPLACE

(75) Inventors: Manoel Tenorio, Mountain View, CA (US); Hari Menon, Fremont, CA (US)

(73) Assignee: i2 Technologies US, Inc., Dallas, TX (US)

( * ) Notice: Subject to any disclaimer, the term of this patent is extended or adjusted under 35 U.S.C. 154(b) by 777 days.

(21) Appl. No.: 09/884,007

(22) Filed: Jun. 18, 2001

(51) Int. Cl.
*G06F 7/00* (2006.01)

(52) U.S. Cl. ................. 707/3; 707/10; 707/104.1; 709/217; 709/225; 235/383

(58) Field of Classification Search ............ 705/27, 705/26; 707/3, 10, 104.1; 709/217, 225; 235/383; 713/168
See application file for complete search history.

(56) References Cited

U.S. PATENT DOCUMENTS

| | | | |
|---|---|---|---|
| 3,961,164 A | 6/1976 | Reed et al. ............. 235/61.12 |
| 5,347,632 A | 9/1994 | Filepp et al. ............. 395/200 |
| 5,551,027 A | 8/1996 | Choy et al. ............. 395/600 |
| 5,564,043 A | 10/1996 | Siefert ............. 395/600 |
| 5,642,419 A | 6/1997 | Rosen ............. 380/23 |
| 5,694,546 A | 12/1997 | Reisman ............. 395/200.9 |
| 5,721,832 A | 2/1998 | Westrope et al. ............. 395/227 |
| 5,727,129 A | 3/1998 | Barrett et al. ............. 395/12 |
| 5,777,608 A | 7/1998 | Lipovski et al. ............. 345/189 |
| 5,790,677 A | 8/1998 | Fox et al. ............. 380/24 |
| 5,870,473 A | 2/1999 | Boesch et al. ............. 580/21 |
| 5,918,229 A | 6/1999 | Davis et al. ............. 707/10 |
| 5,926,797 A | 7/1999 | Goodwin, III ............. 705/20 |
| 5,935,207 A | 8/1999 | Logue et al. ............. 709/219 |
| 5,963,134 A | 10/1999 | Bowers et al. ............. 340/572.1 |
| 5,970,471 A | 10/1999 | Hill ............. 705/26 |
| 5,983,309 A | 11/1999 | Atsatt et al. ............. 711/4 |
| 5,987,233 A | 11/1999 | Humphrey ............. 395/200.47 |
| 5,991,115 A | 11/1999 | Chainer et al. ............. 360/75 |
| 6,006,218 A | 12/1999 | Breese et al. ............. 707/3 |
| 6,016,493 A | 1/2000 | Burrows ............. 707/101 |
| 6,038,668 A | 3/2000 | Chipman et al. ............. 713/201 |
| 6,049,673 A | 4/2000 | McComb et al. ............. 395/712 |
| 6,078,891 A | 6/2000 | Riordan et al. ............. 705/10 |
| 6,081,840 A | 6/2000 | Zhao ............. 709/224 |
| 6,094,680 A | 7/2000 | Hokanson ............. 709/223 |

(Continued)

OTHER PUBLICATIONS

AT&L Knowledge Sharing System "Ask a Professor—Question & Answer Detail," 2 pages.

*Primary Examiner*—Andrew Joseph Rudy
(74) *Attorney, Agent, or Firm*—Booth Udall, PLC (57) ABSTRACT

An electronic commerce system (10) includes a content enhancement module (47) that analyzes the product data stored in a seller database (32) using one or more rules and that identifies one or more potential errors in the product data according to the rules. The rules include one or more generic rules that apply to substantially all seller databases (32) including product data. These generic rules include one or more of the following rules: a rule indicating that a potential error exists if two products in the seller database (32) have identical product identifiers but have otherwise different product data, a rule indicating that a potential error exists if two products in the seller database (32) have different product identifiers but have otherwise identical product data, and rules indicating that a potential error exists if the values associated with particular generic product attributes have a non-numerical format.

13 Claims, 4 Drawing Sheets

U.S. PATENT DOCUMENTS

| | | | |
|---|---|---|---|
| 6,101,515 A | 8/2000 | Wical et al. | 707/531 |
| 6,105,134 A | 8/2000 | Pinder et al. | 713/170 |
| 6,128,600 A | 10/2000 | Imamura et al. | 705/27 |
| 6,128,624 A | 10/2000 | Papierniak et al. | 707/104 |
| 6,141,647 A * | 10/2000 | Meijer et al. | 705/1 |
| 6,144,996 A | 11/2000 | Starnes et al. | 709/217 |
| 6,154,738 A | 11/2000 | Call | 707/4 |
| 6,189,043 B1 | 2/2001 | Buyukkoc et al. | 709/241 |
| 6,192,131 B1 | 2/2001 | Geer, Jr. et al. | 380/283 |
| 6,199,082 B1 | 3/2001 | Ferrel et al. | 707/522 |
| 6,212,512 B1 | 4/2001 | Barney et al. | 707/1 |
| 6,236,975 B1 * | 5/2001 | Boe et al. | 705/7 |
| 6,236,978 B1 | 5/2001 | Tuzhilin | 705/26 |
| 6,271,846 B1 | 8/2001 | Martinez et al. | 345/357 |
| 6,285,366 B1 | 9/2001 | Ng et al. | 345/356 |
| 6,286,002 B1 | 9/2001 | Axaopoulos et al. | 707/10 |
| 6,289,382 B1 | 9/2001 | Bowman-Amuah | 709/226 |
| 6,324,522 B2 | 11/2001 | Peterson et al. | 705/28 |
| 6,334,131 B2 * | 12/2001 | Chakrabarti et al. | 707/10 |
| 6,336,910 B1 * | 1/2002 | Ohta et al. | 604/6.13 |
| 6,338,067 B1 * | 1/2002 | Baker et al. | 707/100 |
| 6,341,280 B1 | 1/2002 | Glass et al. | 707/3 |
| 6,343,287 B1 | 1/2002 | Kumar et al. | 707/4 |
| 6,356,899 B1 | 3/2002 | Chakrabarti et al. | 707/5 |
| 6,366,910 B1 | 4/2002 | Rajaraman et al. | 707/5 |
| 6,370,527 B1 | 4/2002 | Singhal | 707/6 |
| 6,397,221 B1 * | 5/2002 | Greef et al. | 707/102 |
| 6,415,320 B1 | 7/2002 | Hess et al. | 709/219 |
| 6,460,038 B1 | 10/2002 | Khan et al. | 707/10 |
| 6,466,240 B1 | 10/2002 | Maslov | 451/853 |
| 6,466,918 B1 | 10/2002 | Spiegel et al. | 705/27 |
| 6,470,344 B1 | 10/2002 | Kothuri et al. | 707/100 |
| 6,476,832 B1 | 11/2002 | Park | 345/789 |
| 6,489,968 B1 | 12/2002 | Ortega et al. | 345/713 |
| 6,490,567 B1 | 12/2002 | Gregory | 705/39 |
| 6,490,619 B1 | 12/2002 | Byrne et al. | 709/223 |
| 6,516,350 B1 | 2/2003 | Lumelsky et al. | 709/226 |
| 6,532,481 B1 * | 3/2003 | Fassett, Jr. | 707/203 |
| 6,553,364 B1 | 4/2003 | Wu | 707/1 |
| 6,581,072 B1 | 6/2003 | Mathur et al. | 707/104.1 |
| 6,591,252 B1 | 7/2003 | Young | 705/67 |
| 6,708,161 B2 | 3/2004 | Tenorio et al. | 707/2 |
| 6,738,850 B2 * | 5/2004 | Lai et al. | 710/266 |
| 6,745,177 B2 | 6/2004 | Kepler et al. | 707/3 |
| 6,775,655 B1 | 8/2004 | Peinado et al. | 705/59 |
| 6,778,991 B2 | 8/2004 | Tenorio | 707/10 |
| 6,842,737 B1 * | 1/2005 | Stiles et al. | 705/6 |
| 6,865,524 B1 * | 3/2005 | Shah et al. | 703/13 |
| 6,892,195 B2 * | 5/2005 | Lee et al. | 706/61 |
| 2001/0016846 A1 | 8/2001 | Chakrabarti et al. | 707/102 |
| 2001/0032162 A1 | 10/2001 | Alsberg et al. | 705/37 |
| 2001/0034814 A1 | 10/2001 | Rosenzweig | 711/118 |
| 2001/0044751 A1 | 11/2001 | Pugliese, III et al. | 705/26 |
| 2001/0051927 A1 | 12/2001 | London et al. | 705/51 |
| 2002/0026386 A1 | 2/2002 | Walden | 705/27 |
| 2002/0032597 A1 | 3/2002 | Chanos | 705/10 |
| 2002/0046187 A1 | 4/2002 | Vargas et al. | 705/67 |
| 2002/0123955 A1 | 9/2002 | Andreski et al. | 705/37 |
| 2002/0147704 A1 | 10/2002 | Borchers | 707/3 |
| 2003/0033205 A1 | 2/2003 | Nowers et al. | 705/26 |
| 2003/0149934 A1 | 8/2003 | Worden | 715/513 |
| 2003/0167213 A1 | 9/2003 | Jammes et al. | 705/27 |
| 2003/0195877 A1 | 10/2003 | Ford et al. | 707/3 |
| 2004/0068576 A1 | 4/2004 | Lindbo et al. | 709/232 |

* cited by examiner

| PID | PRODUCT TYPE | MANUFACTURER | INK COLOR | TIP SIZE | ... | PRICE |
|---|---|---|---|---|---|---|
| 23 | BALL POINT | ABC | BLUE | MEDIUM | ... | 0.12 |
| 29 | BALL POINT | ABC | BLACK | MEDIUM | ... | 0.12 |
| 56 | BALL POINT | XYZ | BLACK | MEDIUM | ... | 0.13 |
| 98 | BALL POINT | XYZ | GREEN | MEDIUM | ... | 0.13 |
| ... | ... | ... | ... | ... | ... | ... |
| 12 | FELT TIP | XYZ | BLACK | BROAD | ... | 0.17 |
| 16 | FELT TIP | ABC | BLACK | BROAD | ... | 0.18 |
| 56 | FELT TIP | ABC | RED | FINE | ... | 0.16 |
| 123 | FELT TIP | XYZ | RED | FINE | ... | 0.16 |
| ... | ... | ... | ... | ... | ... | ... |
| 2 | ROLLER BALL | XYZ | BLUE | FINE | ... | 0.25 |
| 59 | ROLLER BALL | XYZ | BLACK | FINE | ... | 0.25 |
| 143 | ROLLER BALL | XYZ | BLACK | MEDIUM | ... | 0.22 |
| 456 | ROLLER BALL | ABC | RED | EXTRA FINE | ... | 0.29 |
| ... | ... | ... | ... | ... | ... | ... |

FIG. 3

FIG. 5

CONTENT ENHANCEMENT IN AN ELECTRONIC MARKETPLACE

TECHNICAL FIELD OF THE INVENTION

This invention relates to the electronic commerce and more particularly to content enhancement in an electronic marketplace.

BACKGROUND OF THE INVENTION

Due to the ever-increasing popularity and accessibility of the Internet as a medium of communication, the number of business transactions conducted using the Internet is also increasing, as are the numbers of buyers and sellers participating in electronic marketplaces providing a forum for these transactions. The majority of electronic commerce ("e-commerce") transactions occur when a buyer determines a need for a product, identifies a seller that provides that product, and accesses the seller's web site to arrange a purchase of the product. If the buyer does not have a preferred seller or if the buyer is purchasing the product for the first time, the buyer will often perform a search for a number of sellers that offer the product and then access numerous seller web sites to determine which seller offers certain desired product features at the best price and under the best terms for the buyer. The matching phase of e-commerce transactions (matching the buyer with a particular seller) is often inefficient because of the large amount of searching involved in finding a product and because once a particular product is found, the various offerings of that product by different sellers may not be easily compared.

SUMMARY OF THE INVENTION

According to the present invention, disadvantages and problems associated with previous e-commerce techniques have been substantially reduced or eliminated.

In one embodiment of the present invention, an electronic commerce system includes a content enhancement module that analyzes the product data stored in a seller database using one or more rules and that identifies one or more potential errors in the product data according to the rules. The rules include one or more generic rules that apply to substantially all seller databases including product data. These generic rules include one or more of the following rules: a rule indicating that a potential error exists if two products in the seller database have identical product identifiers but have otherwise different product data, a rule indicating that a potential error exists if two products in the seller database have different product identifiers but have otherwise identical product data, and rules indicating that a potential error exists if the values associated with particular generic product attributes have a non-numerical format.

Particular embodiments of the present invention may provide one or more technical advantages. Embodiments of the present invention may be used in association with a global content directory used by buyers to search for products offered by a number of sellers and to establish communications with an appropriate seller or sellers. Certain embodiments of the present invention provide for enhancement of content, such as product data associated with the global content directory, by automatically checking the content for errors and other problems. Therefore, at least some errors in the content may be corrected to provide better service to buyers accessing the content using the global content directory. Furthermore, the need for a seller providing the data to manually search the content for errors before submitting the content for use with the global content directory may be reduced or eliminated. To facilitate the identification of potential errors in content, particular embodiments of the present invention may use generic rules that apply to most, if not all, of the content provided by a variety of different sellers. Particular embodiments may also use domain-specific rules that may be tailored to specific types of sellers, products, and/or industries. Other technical advantages may be readily apparent to those skilled in the art from the following figures, description, and claims.

BRIEF DESCRIPTION OF THE DRAWINGS

To provide a more complete understanding of the present invention and the features and advantages thereof, reference is made to the following description taken in conjunction with the accompanying drawings, in which.

DETAILED DESCRIPTION OF EXAMPLE EMBODIMENTS

Figure 1:
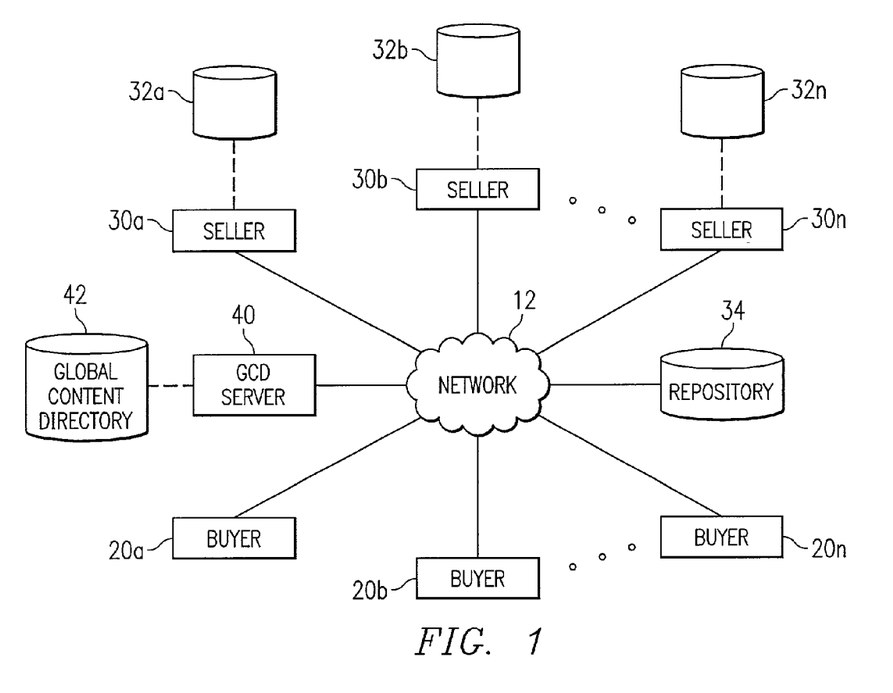
FIG. 1 illustrates an example electronic commerce system.

FIG. 1 illustrates an example system 10 that includes a network 12 coupling buyers 20, sellers 30, and a global content directory (GCD) server 40. System 10 enables electronic commerce ("e-commerce") transactions between buyers 20 and sellers 30 through the use of a GCD 42 supported by GCD server 40. GCD 42 may be internal or external to GCD server 40. Network 12 may include any appropriate combination of public and/or private networks coupling buyers 20, sellers 30, and GCD server 40. In an example embodiment, network 12 includes the Internet and any appropriate local area networks (LANs), metropolitan area networks (MANs), or wide area networks (WANs) coupling buyers 20, sellers 30, and GCD server 40 to the Internet. Since the Internet is accessible to the vast majority of buyers and sellers in the world, the present invention potentially includes all of these buyers and sellers as buyers 20 and sellers 30 associated with system 10. However, the use of the term "global" should not be interpreted as a geographic limitation necessarily requiring that GCD 42 provide directory services to buyers 20 and sellers 30 around the world (or in any other particular region) or that the content of GCD 42 be from all over the world (or from any other particular region).

Although buyers 20 and sellers 30 are described as separate entities, a buyer 20 in one transaction may be a seller 30 in another transaction, and vice versa. Moreover, reference to "buyer" or "seller" is meant to include a person, a computer system, an organization, or another entity where appropriate. For example, a buyer 20 may include a computer programmed to autonomously identify a need for a product, search for that product, and buy that product upon identifying a suitable seller. Although buying and selling are primarily described herein, the present invention contemplates any appropriate e-commerce transaction. Moreover, reference to "products" is meant to include goods, real property, services, information, or any other suitable tangible or intangible things.

A typical e-commerce transaction may involve a "matching" phase and a "transactional" phase. During the matching phase, a buyer 20 may search for a suitable product (meaning any good, real property, service, information, or other tangible or intangible thing that may be the subject of an e-commerce transaction) offered by one or more sellers 30, identify the most suitable seller 30 (which may involve, for example, identifying the seller 30 offering the lowest price), and contact that seller 30 to enter the transactional phase. During the transactional phase, the buyer 20 and seller 30 may negotiate a contract for the sale of the product (which may involve, for example, more clearly defining the subject of the transaction, negotiating a price, and reaching an agreement on supply logistics) and generate a legal document embodying the terms of the negotiated contract. To identify the most suitable seller 30 during the matching phase without the use of GCD 42, a buyer 20 may have to access numerous seller web sites to determine which seller 30 offers certain desired features of the product at the best price. Sellers 30 may each provide one or more databases 32, such as relational databases, that include data identifying the products available from sellers 30 and their features. Each database 32 may be accessed through the associated seller's web site or in any other appropriate manner. The multiple one-to-one (one buyer 20 to one seller 30) searches that this process requires are inefficient and expensive because of the large amount of searching involved in finding a product and because the various offerings of that product by different sellers 30 may not be easily compared.

Alternatively, multiple sellers 30 may be grouped in an electronic marketplace according to the products they provide and a buyer 20 may search the offerings of the multiple sellers 30 at a single web site. However, if buyer 20 wishes to obtain several different types of products, buyer 20 may have to go to several different types of marketplaces. Furthermore, there may be numerous competing marketplaces that buyer 20 has to search to perform the matching phase of a transaction for a particular product. One potential method of addressing this problem is to create a global product database that potentially includes data identifying the features of all the products that any buyer may wish to obtain. Therefore, the global database would include the combined contents of every database 32 associated with every seller 30. However, such a global database would have many problems. For example, the sheer size of the database would make it difficult to search and thus the database would suffer from performance problems. In addition, it would be difficult to allow large numbers of buyers 20 to search the database at once. Furthermore, all sellers 30 would be required to access the global database to update their information and the entire database would have to be updated each time a change is made. Many other problems might also exist.

A solution to the above problems, at least in part, is GCD 42. GCD 42 is a universal directory of the contents of multiple seller databases 32 (and potentially all seller databases 32). GCD 42 may be implemented using one or more servers 40 or other computers located at one or more locations. Most or all of the content in these seller databases 32 remains stored in databases 32, but this content is accessible using GCD 42. Therefore, like the global database described above, GCD 42 provides buyers 20 with access to product data relating to a multitude of products (and potentially seller data relating to one or more sellers 30 of the products), but unlike the global database, GCD 42 does not attempt to store all of this data in one enormous database. Where appropriate, reference to "data" or "content" is meant to include product data (meaning information reflecting values for certain attributes of a product), seller data (meaning information reflecting values for certain seller attributes), or both product data and seller data.

GCD 42 provides a directory of products using a directory structure in which products are organized using a hierarchical classification system. A buyer 20 may navigate or search the directory to find a particular product class into which products are categorized. The product data (and potentially seller data) associated with a product included in a product class may actually be stored in and obtained by GCD 42 from a seller database 32. However, the requested data may be transparently provided to buyer 20 such that all of the product data may appear to buyer 20 as being included in GCD 42. Although product and/or seller data has primarily been described as being stored in seller databases 32, the present invention contemplates product data being stored in any suitable manner and being retrieved from any suitable sources. For example, system 10 may include a shared data repository 34 that contains product data and/or seller data that may be combined with data from one or more seller databases 32, as described in further detail below.

Figure 2:
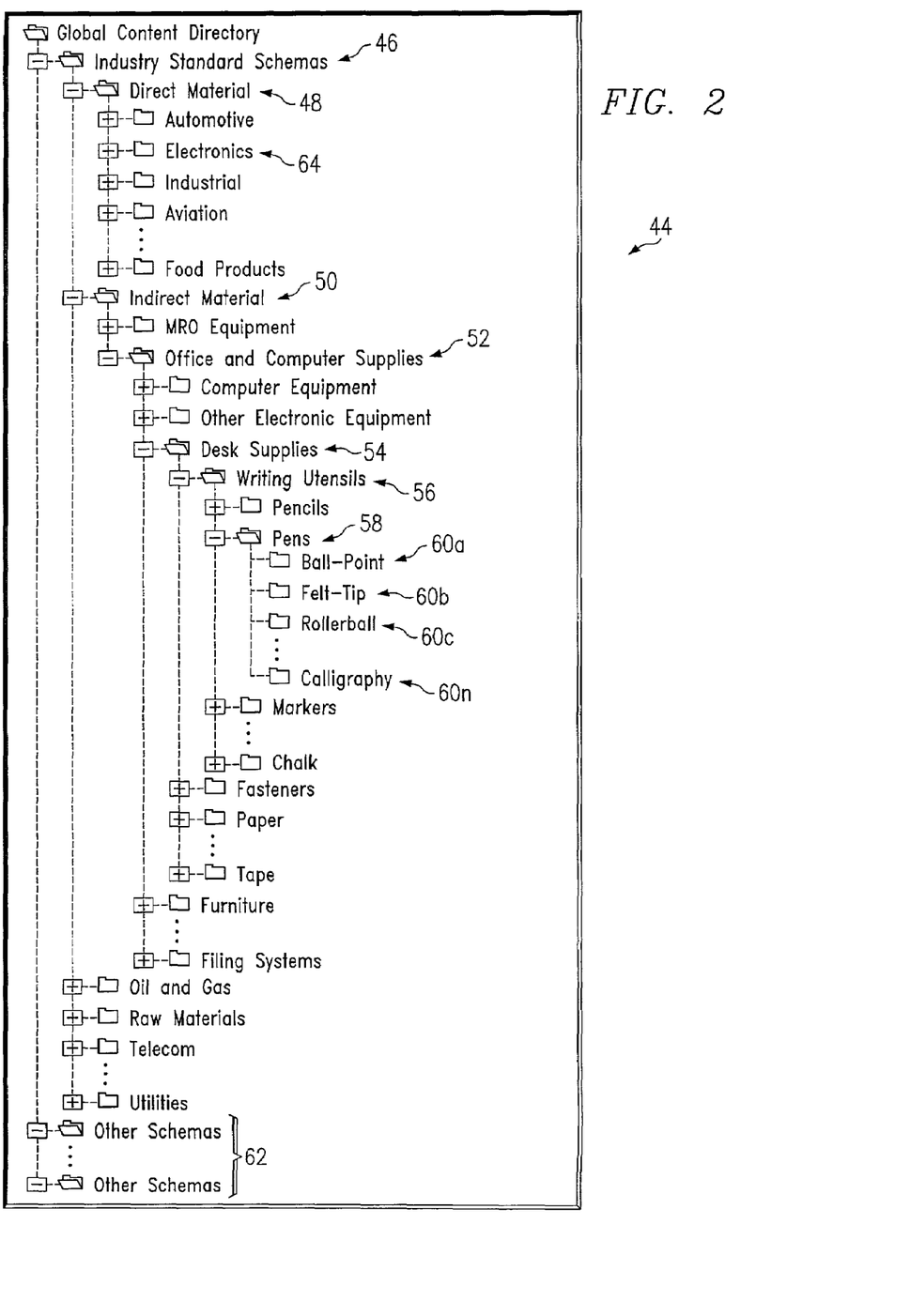
FIG. 2 illustrates an example directory structure of an example global content directory.

FIG. 2 illustrates an example directory structure 44 of an example GCD 42. Products categorized in GCD 42 may be organized according to schemas. A schema may include a set of product classes (which may be referred to as a "taxonomy") organized in a hierarchy, each class being associated with a set of product features, characteristics, or other product attributes (which may be referred to as a "product ontology"). For example, pens may have different kinds of tips (such as ball point or felt tip), different tip sizes (such as fine, medium, or broad), and different ink colors (such as blue, black, or red). Accordingly, a schema may include a class corresponding to pens that has a product ontology including tip type, tip size, and color, or other appropriate attributes. Within a class, products may be defined by product attribute values (such as, for example, ball point, medium tip, blue ink). Reference to "value" is meant to include any appropriate data reflecting an instance of a product attribute or a seller attribute. Product attribute values and seller attribute values may include numbers, letters, figures, characters, symbols, or other suitable information for describing a product or a seller, respectively. In one embodiment, a product ontology may be divided into entry-required attributes (meaning attributes for which a value has to be provided) and entry-optional attributes (meaning attributes for which a value is optional), and these categories may be further divided into commercial features and design features (or any other suitable divisions).

In addition to a taxonomy and product ontologies, a schema may include a set of attributes for each seller (which may be referred to as a "seller ontology"). Such attributes may include geographic restrictions (such as served markets), currencies accepted by each seller, collaboration tools accepted by each seller, contract terms accepted by each seller, types of contracts accepted by each seller, levels of buyer credit required by each seller, and any other suitable seller attributes. Similar to a products within a product class, sellers offering products within a product class may be defined by seller attribute values corresponding to seller attributes. Accordingly, a schema may include a set of classes, each including one or more products, and each class may be associated with a set of product attributes and a set of seller attributes.

In example directory structure 44, products may be organized and cataloged according to industry standard schemas 46 or other appropriate schemas, as described below. Within industry standard schemas 46, there are two example classes: a direct materials class 48 and an indirect materials class 50. Each of these classes 48 and 50 includes several sub-classes (which may themselves include sub-classes). Therefore, the numerous classes of directory structure 44 form a "tree-like" hierarchical structure into which products may be categorized. For example purposes, certain portions of directory structure 44 are "expanded" in FIG. 2 to show various levels of classes. The "level" of a class is indicated by the number of other classes between that class and a root class (such as industry standard schemas class 46). For example, indirect material class 50 is at the same level in directory structure as direct material class 48. Indirect material class 50 may include an office and computer supplies class 52, which includes a desk supplies class 54, which includes a writing utensils class 56. Furthermore, writing utensils class 56 includes a pens class 58, which includes numerous pen type classes 60*a*-60*n* ("n" indicating that any number of classes 60 may be included in pens class 58). Each of classes 50, 52, 54, 56, 58, and 60 is located at a different level of directory structure 44. A class at any level in directory structure 44 may include one or more sub-classes, those sub-classes may include one or more sub-classes, and so on until a desired specificity of categorization is reached. A series of classes from a highest level class (the broadest class) to a lowest level class (the most specific class) may be referred to as a "branch" of directory structure 44. For example, classes 46, 48, 50, 52, 54, 56, 58, and 60*b* form one branch of directory structure 44.

Although example directory structure 44 may use industry standard schemas 46 as described above, any other appropriate schemas 62 may be used in addition to or instead of industry standard schemas 46. For example, while industry standard schemas 46 may be organized from a seller's viewpoint, other schemas 62 may be used that organize products from a buyer's viewpoint. For example, a buyer 20 may wish to furnish a kitchen of a new house with various products, such as appliances, window treatments, paint, cabinetry, plumbing, dishes, and cooking utensils. Using one schema 62, these products may be organized into a variety of unrelated classes based on certain features of the products (for example, certain kitchen appliances may be categorized in an electronics class 52 of directory structure 44 while paint may be categorized into an industrial class 52). However, another example schema 62 may categorize all such products into a home products class (which may include several classes further categorizing the products, such as a kitchen products class which includes a kitchen appliances class, which includes a refrigerator class, and so on). Therefore, the same product may be included in multiple schemas 62. These alternative schemas may be included in directory structure 44 and may be stored as a part of or separate from GCD 42.

A buyer 20 may navigate through directory structure 44 by expanding or collapsing various classes as desired. For example, FIG. 2 illustrates an expansion of certain classes of directory structure 44 to reach a felt-tip pen class 60*b*. Once a buyer 20 has navigated to a class that is specific enough for buyer 20 (and/or a class that is at the end of a branch), buyer 20 may perform a search for products within that class. For example, buyer 20 can search for all products in writing utensils class 56 that are blue felt-tip pins having medium tips. Alternatively, if buyer 20 navigates to the end of a branch of directory structure 44, such as felt-tip pen class 60*b*, GCD 42 may then enable buyer 20 to search for such pens that have blue ink and medium tips (which may reach the same result as the search above).

Buyer 20 may also search for sellers matching one or more seller attribute values within a product class. For example, in addition to searching for all products in writing utensils class 56 that are blue felt-tip pins having medium tips, buyer 20 may search for sellers 30 serving Texas that accept U.S. dollars. Buyer 20 may search for products matching certain product attribute values and sellers matching certain seller attribute values in any appropriate manner. In one embodiment, for example, buyer 20 provides search criteria including both values for product attributes and for seller attributes (search criteria may instead be generated automatically, in whole or in part, as described below), and server 40 searches for products that match the product attribute criteria and are offered by sellers matching the seller attribute criteria. In another embodiment, buyer 20 provides only product attribute values as search criteria, and server 40 limits its search for products matching the product attribute criteria to databases 32 associated with sellers 30 known to match seller attribute criteria that buyer 20 may want according to a buyer profile or otherwise.

As described above, in one embodiment product data (at least product data more detailed than data provided by a taxonomy) and seller data are not stored in GCD 42, but are stored in databases 32. For example, a seller 30 may maintain a relational database 32 that includes a plurality of tables containing product attribute values for a variety of products and attribute values for seller 30 for each product, a set of products, or all of the products offered by seller 30. Product data and seller data may be integrated into one or more tables or may be segregated into different tables.

Moreover, product data and seller data for a seller 30 may be stored in the same or separate databases. One or more pointers may be associated with each class to identify the location of one or more databases 32 that include product data and/or seller data for products contained in that class or to identify particular data in databases 32. Therefore, GCD 42 may execute a search for products in databases 32 identified by a pointer corresponding to a user-selected (or automatically selected) class. GCD 42 may also return the network location (such as a uniform resource locator (URL) or other network address) of the database 32 to buyer 20 so that buyer 20 may independently access database 32. Databases 32 may be searched using any appropriate method including, but not limited to, a structured query language (SQL) query.

GCD 42 may be implemented using the lightweight directory access protocol (LDAP), which enables directories to be provided using the tree-like structure described above. However, any other appropriate technique or protocol for creating GCD 42 may alternatively be used and GCD 42 may have any appropriate structure. Furthermore, GCD 42 may be an object-oriented directory (which is also provided by LDAP) such that each class in directory structure 44 includes the attributes of parent classes in which the class is a sub-class. In this embodiment, a product class listed at the end of a branch of the tree structure includes all of the attributes of its parent classes in the branch. Furthermore, each product included in a database 32 may be an object that includes all the attributes of the classes in which the product is included. Thus, when a search is performed from a class at the end of a branch of directory structure 44, the search query may automatically include any appropriate attributes of parent classes of the class.

For example, if a buyer 20 has navigated through directory structure 44 to felt-tip pens class 60*b*, a search performed by buyer 20 (or by GCD 42 on behalf of buyer 20) from felt-tip pens class 60*b* may automatically be limited to a search for felt-tip pens and buyer 20 may introduce additional desired search criteria (such as blue ink and medium tip). Therefore, if a database 32 searched includes product data relating to a variety of writing utensils, a search of database 32 may be automatically limited by GCD 42 to only include felt-tip pens within that database 32. Buyer 20 may also identify additional product attribute values and/or seller attribute values as additional search criteria.

When GCD 42 has performed a search of the databases 32 identified by a pointer or pointers associated with a class that buyer 20 has selected (or that has been automatically selected), GCD 42 may return product data and/or seller data associated with one or more products matching the search criteria. GCD 42 may integrate the product data and/or seller data resulting from the search into directory structure 44 so that the data appears to buyer 20 as being part of GCD 42. GCD 42 may alternatively present the results of the search in any other appropriate manner. Each product resulting from the search may be an object which is unique instance of the class in which buyer 20 is searching. Furthermore, each such object (and its location) may be uniquely identified using a numbering scheme corresponding to directory structure 44.

In summary, a buyer 20 may search for a product matching certain product attribute values available from a seller matching certain seller attribute values using GCD 42 and thus eliminate or reduce the need for buyer 20 individually to search numerous seller databases 32 to find the desired product available from a suitable seller. GCD 42 provides access to product and/or seller data relating to these numerous products using directory structure 44, which organizes products using a hierarchical, object-oriented classification system. Buyer 20 may navigate or search directory structure 44 to find a particular classification of products and various information associated with the products within this classification, initiate a search of databases 32 including product and/or seller data relating to a product, and then communicate with an appropriate database 32 through GCD server 40 or otherwise. Such access to vast numbers of products is provided without the requirement that all data about the products and/or sellers be stored in a global database. Instead, this data may be stored in seller databases 32 that can be readily accessed using GCD 42.

One problem that may be associated with the use of the various seller databases 32 is that these databases 32 may include product data about the same class of product (for example, felt-tip pens), but may identify products of that class using different attribute values, may use different names for the same product attribute value, and/or may quantify or distinguish product attribute values differently (using different units of measurement, for example). The same may be true for seller data that may be contained in databases 32. Some of these issues may be solved using translation mechanisms that convert the data into a uniform format used by GCD 42. Alternatively, sellers 30 may create new databases 32 or manually modify existing databases 32 (or may hire a third party to create or modify databases 32) to conform to a uniform standard in anticipation of a database 32 being used in association with GCD 42.

One disadvantage to seller 30 (or a third party) creating data that is appropriate for use with GCD 42 is that the generation of such data is typically expensive and time-consuming. If seller 30 has already created product data (for example, for access by buyers 20 using the seller's web site), seller 30 may be reluctant to repeat the process and expense of recreating, expanding, reformatting, translating, or otherwise modifying existing product data into a format appropriate for use with GCD 42. However, if seller 30 does not properly format its product data and instead uses a pre-existing data format in conjunction with GCD 42, the seller's product data may not be properly associated with GCD 42 and seller 30 may be disadvantaged during the matching phase of a transaction. For example, if the product ontology associated with pens class 58 in directory structure 44 includes ink color as a product attribute and seller 30 does not have this information in its product data or does not refer to this information as "ink color" in its database 32, then a search conducted using GCD 42 for pens having a particular ink color may not properly identify products in database 32 that meet the search criteria. Alternatively, the seller's products may be identified in the search results, but may be ranked lower in the search results since seller 30 does not provide information about the ink color or does provide the information but does not format the information appropriately for use with GCD 42.

One solution to the above problem is to provide a shared product data repository 34 that includes product data relating to numerous common products and which is properly formatted and complete for use with GCD 42. The product data in repository 34 may be made available, for a fee or otherwise, to sellers 30 who do not wish to create (or pay a third party to create) product data for use with GCD 42 or recreate, expand, reformat, translate, or otherwise modify existing product data for use with GCD 42. As an example only, although hundreds of sellers 30 participating in system 10 may sell pens, there may be only a few manufacturers that make the pens sold by sellers 30. Therefore, it may be more efficient and cost effective for the manufacturers to create much of the product data for the pens that they produce and provide this data in repository 34 instead of each seller 30 creating redundant product data for the pens. Alternatively, the product data in repository 34 may be created by an entity associated with GCD 42 or any other appropriate entity.

Product data relating to a particular product that is not seller-specific and/or that changes relatively infrequently (compared to "dynamic" product data, described below) may be created by the manufacturer or another entity and stored in repository 34 for use by sellers 30. This data may be referred to as "static" product data. Examples of static product data relating to a pen may include data relating to ink color, tip type, and tip size of the pen. Other product data relating to a product that is seller-specific and/or that changes relatively frequently (compared to "static" product data) may be created by sellers 30 and stored in seller databases 32. This data may be referred to as "dynamic" product data. Examples of dynamic product data relating to a pen may include data relating to the price, availability, and lead time associated with the pen. Optimally, the combination of the static and dynamic data relating to a particular product will include values for each of the product attributes included in the product ontology of the classes of GCD 42 in which the product is classified. For example, pens class 58 in GCD 42 may have an associated product ontology that includes ink color, tip type, tip size, price, availability, and lead time attributes. Preferably the combination of static product data in repository 34 and dynamic product data in a seller database 32 relating to the pen includes values for each of these product attributes.

When a seller 30 wishes to sell a product using GCD 42, the seller 30 may first determine whether repository 34 includes static product data for the product. Seller 30 may obtain information regarding what product data is included in repository 34 by querying GCD server 40, by querying an entity associated with the repository 34, by directly accessing repository 34, or using any other appropriate technique. If static data for the particular product or products is included in repository 34, then seller 30 may request that the static product data be associated with seller 30 and one or more of its products. As described above, one or more pointers may be associated with each class to identify the location of one or more seller databases 32 that include product data for products contained in that class or to identify particular data in databases 32. In addition, pointers associated with a class may identify the location of a repository 34 and may identify particular data in repository 34. Furthermore, one or more pointers to repository 34 may be linked to one or more pointers to a seller database 32 such that the information from the seller database 32 and repository 34 may be merged. Alternatively, the static product data in repository 34 may be linked with one or more sets of dynamic product data in one or more seller databases 32. Dynamic product data from seller database 32 may be merged with static product data from repository 34 and the combined data may be provided to a buyer 20 as a result of a product search.

Although repository 34 is illustrated as a single storage location, repository 34 may include multiple storage locations at the same or different physical locations. Any appropriate number of storage locations located in a number of physical locations may be used (for example, the storage locations may be distributed in various geographic regions). GCD server 40 may search each of these distributed repositories 34 as appropriate to obtain static product data that is responsive to a buyer's search. Alternatively, pointers associated with a class may direct GCD server 40 to one or more particular storage locations. In addition, if multiple repositories 34 are used, each repository 34 may include identical product data, some common and some different product data, or entirely different product data. Furthermore, repository or repositories 34 may store the product data in any appropriate format using any appropriate storage medium. Moreover, it should be noted that although shared product data repository is described as including static product data, seller databases 32 may also include static product data. This static product data may or not be made available to buyers 20 using GCD 42.

Figure 3:
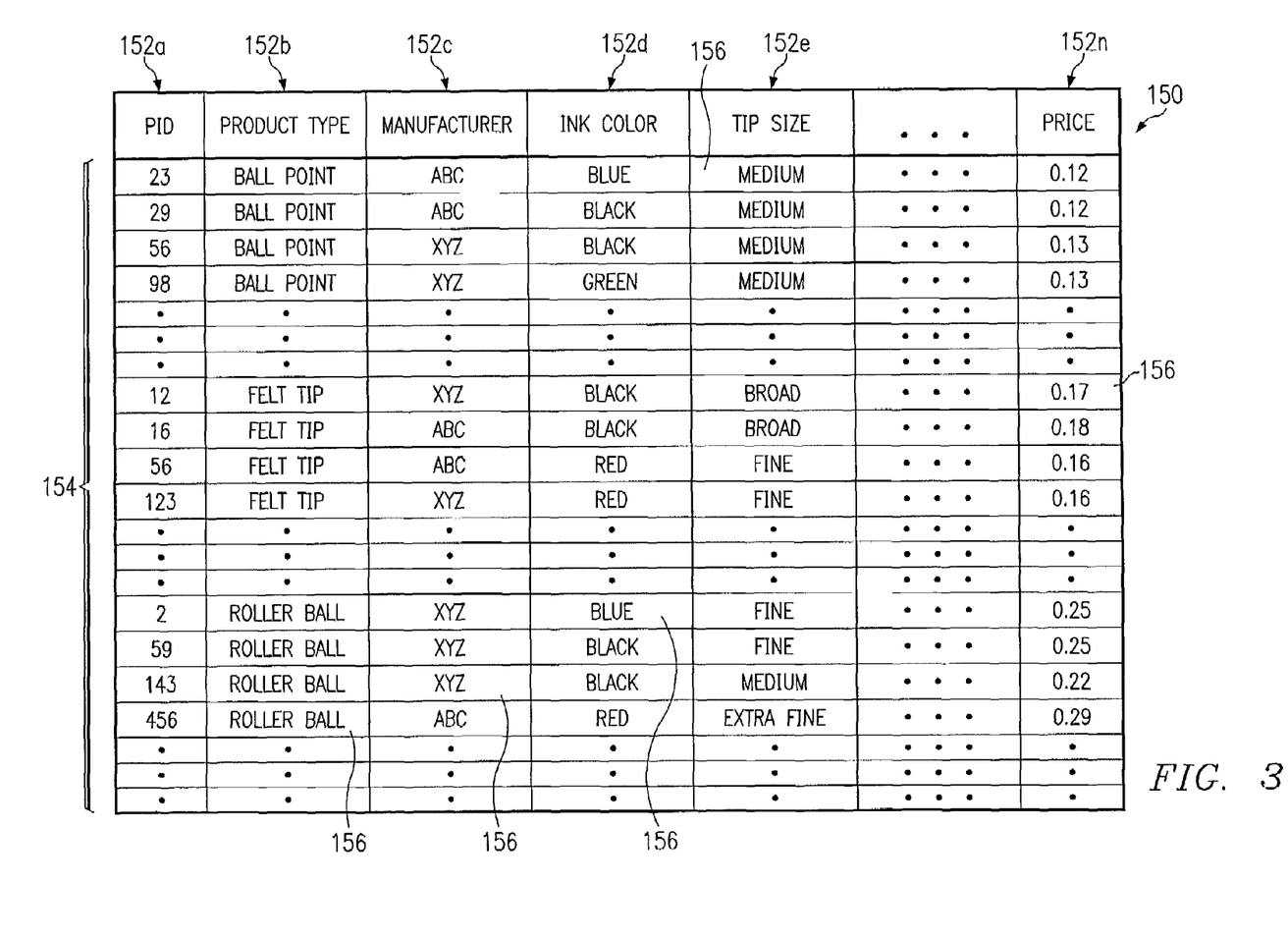
FIG. 3 illustrates an example table of a seller database.

FIG. 3 illustrates an example table 150 that may be included in a seller database 32 and/or repository 34. Database 32 and repository 34 may include one or more tables 150, and each table 150 may contain data relating to one or more products. For example, example table 150 includes data relating to different types of pens. Table 150 may also include data for other types of products (for example, other types of office supplies), or such data may be contained in other tables 150 in database 32 and/or repository 34. Table 150 includes a plurality of columns 152 that each include data relating to a particular product attribute or seller attribute. Although an example number of columns 152 including example product attribute values and seller attribute values are illustrated, it should be understood that any appropriate number and type of product attributes, seller attributes, or other categories of data may be included in table 150. Moreover, as described briefly above, seller data and product data may be segregated into different tables instead of being integrated into the same table as shown in example table 150.

Table 150 also includes a number of rows 154 that may each correspond to a particular product and that each include values for one or more of the product attributes and seller attributes. Each of the values (which may be numeric, textual, or in any other appropriate format) is located at the intersection of the row 154 associated with a particular product and the column 152 that includes a particular product attribute or seller attribute. Each of these intersections may be referred to as a field or cell 156 of table 150. Where seller data and product data are integrated, each row 154 may contain all of the product data and seller data for the product corresponding to that row 154. Alternatively, there may be a row or set of rows dedicated to seller data that may apply to all products offered by a seller 30 or a subset of all such products. Where seller data and product data are segregated, each row in the seller data table may correspond to a set of seller attribute values that may be linked to a set of one or more products in the product data table such that seller data for a product may be accessed when product data for that product is accessed, and vice versa.

The data in one or more columns 152 of table 150 may be indexed to increase the speed with which database reads may be conducted. For example, the fields 156 of ink color column 152d and tip size column 152e may be indexed so that a database query for a pen having a particular ink color and tip size may be quickly performed. Data in table 150 may be indexed using any appropriate database indexing technique. The typical result of such indexing is that when GCD 42 or a buyer 20 requests indexed data from a database 32 and/or repository 34, the associated database management system (or other appropriate interface to database 32 and/or repository 34) does not have to search through every field 156 in the tables 150 included in database 32 and/or repository 34 to locate the requested data. Instead, the data may be indexed such that when a query is submitted for products having certain product attribute values and/or sellers 30 having certain seller attribute values that have been indexed, the database management system already knows the locations of such products in table 150 and may return data associated with these products without searching the entire table 150 or database 32 and/or repository 34 for the products. For example, if the ink color fields 156 and tip size fields 156 of columns 152d and 152e, respectively, are indexed, the index will typically identify the location of all products having black ink and a medium tip size.

If a query is submitted that also specifies a value of one or more non-indexed product attributes (for example, a query for pens manufactured by ABC Company, if the manufacturer fields 156 in column 152c are not indexed) and/or seller attributes, then the associated database management system may perform a search of database 32 and/or repository 34 for products that include the specified value of the one or more non-indexed attributes or seller attributes. However, such a search may be limited to the products already identified (using the index) as including specified values of indexed attributes (for example, pens having black ink and a medium tip) and/or seller attributes that are also included in the search. Therefore, the amount of time required to perform the search may be reduced even though one or more of the product attribute values or seller attribute values that are searched for are not indexed.

Figure 4:
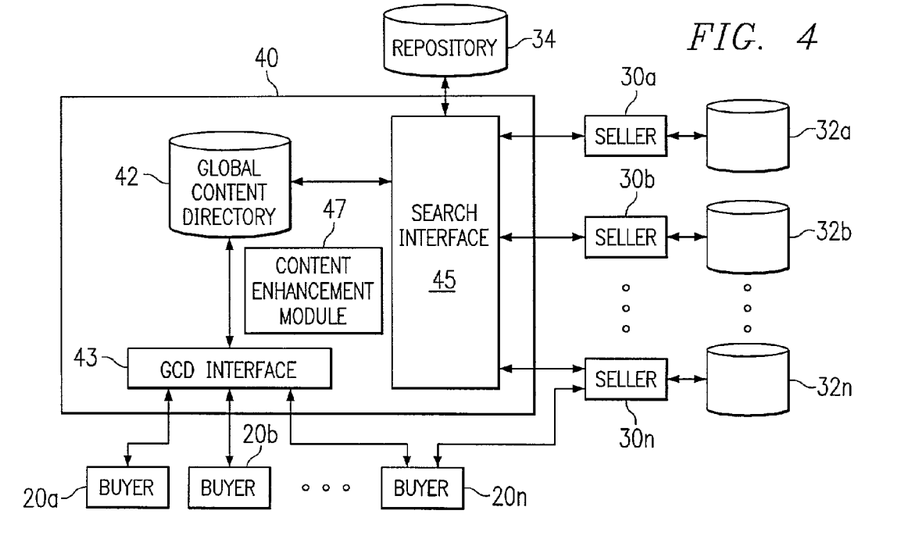
FIG. 4 illustrates an example electronic commerce system in further detail.

FIG. 4 illustrates an example e-commerce system 10 in further detail. As described above, numerous buyers 20 and sellers 30 may be coupled to GCD server 40 using network 12. Buyers 20 may access server 40 using a web browser or in any other appropriate manner and server 40 may provide buyers 20 with access to GCD 42 using a web server or in any other appropriate manner. Although GCD 42 is shown as being internal to GCD server 40, GCD 42 may be internal or external to GCD server 40, as described above. GCD server 40 may also include hardware and/or software for implementing one or more GCD interfaces 43. A buyer 20 may access server 40 and use a GCD interface 43 to search or navigate GCD 42 and/or seller databases 32. Information may be communicated between buyers 20, sellers 30, and GCD 42 using hypertext transport protocol (HTTP), extensible markup language (XML), simple object access protocol (SOAP), or any other suitable communication technique. Each buyer 20 and seller 30 may be issued a unique identifier so that the participants in a transaction facilitated by GCD 42 may be identified. Each buyer 20 and seller 30 may also be assigned a role with respect to a transaction. As described above, a buyer 20 in one transaction may be a seller 30 in another transaction, and vice versa.

In an example transaction, a buyer 20 may access a GCD interface 43 and perform a search of GCD 42. GCD interface 43 may allow buyer 20 to both navigate or "browse" the classes of GCD 42 and to search for a particular class or classes. For example, buyer 20 may either navigate GCD 42 to find a class into which pens are categorized or buyer 20 may search GCD 42 for class names including the word "pen." Any other suitable methods for identifying a particular class may also be used. When buyer 20 has located the appropriate class for the product buyer 20 desires, buyer 20 may then request a listing of products in that class matching certain product attribute values. For example, if buyer 20 is browsing felt-tip pens class 60b, buyer 20 may request all products in class 60b (felt-tip pens) that have red ink and a fine tip and that are sold by a seller 30 located in the United States.

A search interface 45, or any other appropriate component of GCD server 40, may facilitate such a request by searching or requesting searches of repository 34 and/or seller databases 32 identified by one or more pointers associated with felt-tip pens class 60b, as described above. Search interface 45 may provide buyer 20 a search form in which to enter one or more search criteria. The types of search criteria that may be used may be identified in the search form or buyer may be allowed to perform a general search of databases 32 and/or repository 34 for certain terms. For example, search interface 45 may provide buyer 20 with a search form tailored for class 60b that includes fields where buyer 20 can specify a desired ink color, tip thickness, or any other appropriate product-related or seller-related criteria. In one embodiment, the fields of the search form correspond to some or all of the product attributes within the product ontology and/or seller attributes within the seller ontology corresponding to the product class that has been selected, and buyer 20 may enter values for the product attributes and seller attributes in the corresponding search form fields. In lieu of a search form, search interface 45 may instead provide a single field where buyer can enter in desired search terms, such as "red" and "fine" (multiple search terms may be entered using Boolean operators or any other appropriate technique).

Search interface 45, or any other appropriate component of GCD server 40, may also facilitate search requests by accessing a buyer profile for buyer 20 containing information compiled from previous search requests made by buyer 20, previous e-commerce transactions involving buyer 20, or other events or actions on the part of buyer 20. For example, a buyer profile may contain a list of sellers 30 matching seller attribute values that buyer 20 may want. Such a list may be compiled from the results of previous searches by buyer 20. Search interface 45 may access the profile for buyer 20 for any suitable purpose. In one embodiment, search interface 45 may access the profile for buyer 20 to automatically generate search criteria, such as product attribute values and/or seller attribute values, for a search. Search interface 45 may also access the profile for buyer 20 to limit its search for products matching product attribute values provided by buyer 20 (or generated automatically) to databases 32 associated with sellers 30 known to match seller attribute values that buyer 20 may want (and/or data in repository 34 associated with such sellers 30).

Based on search criteria provided by buyer 20 or automatically generated, search interface 45 may communicate a query to the appropriate seller database(s) 32 and/or repository 34 requesting that databases 32 and/or repository 34 each return a listing of all products (including associated product data and/or seller data) that meet the search criteria. Databases 32 and/or repository 34 may also return data relating to attribute values that were not included in the search criteria. For example, databases 32 may return a price and availability of products that meet the search criteria even if price and availability were not search criteria. The responses to the queries of databases 32 and/or repository 34 may be displayed to buyer 20 in any appropriate manner. For example, the products may be listed in order of relevance to the search criteria according to any suitable matching criteria. Furthermore, GCD 42 may reorder the product listing based on a request from buyer 20. For example, buyer 20 may request that the matching products be listed in order from least expensive to most expensive. Alternatively, the search results may be communicated directly to buyer 20 from databases 32 and/or repository 34.

Buyer 20 may select a product from the product listing to indicate a desire to initiate a transaction regarding the product, such as a purchase of the product. On such a selection, GCD 42 may communicate a repository identifier (RID) identifying the selected seller 30 and a globally unique identifier (GUID) for the product to buyer 20. For example, an RID may be the network address (such as an IP address) of a seller network node 30 or may be associated with the network address in a table (in which case GCD 42 may use the RID to look up the associated network address and then communicate the network address to buyer 20). Buyer may access the seller 30 using the RID (or network address) and request a transaction regarding the product using the GUID. GCD 42 may even provide a link including a URL of a web site associated with the seller 30 or may provide another appropriate method for buyer 20 to be connected to seller 20. Although only a single example arrow (between buyer 20n and seller 30n) is shown to illustrate communication between buyers 20 and sellers 30, it should be understood that any buyer 20 may communicate with any seller 30 to conduct appropriate transactions.

In addition to providing a buyer with access to GCD 42 and with the ability to search seller databases 32 and repository 34, GCD server 40 may also provide content enhancement services to sellers 30. Content enhancement services may be used to automatically identify and/or correct errors in the data included in seller databases 32 so as to increase the effectiveness of system 10. These services may be provided when a seller 30 requests to have one or more of its seller databases 32 associated with GCD 42 and may also be provided on an as-needed basis thereafter. The content enhancement services may be provided by a content enhancement module 47 associated with GCD server 40 or any other appropriate component of system 10, whether or not described above. For example, although content enhancement module 47 is illustrated as being associated with GCD server 40, content enhancement module 47 may be associated with one or more seller databases 32. Content enhancement module 47 may be implemented as any appropriate combination of software and/or hardware at one or more locations. Furthermore, although content enhancement module 47 is described below in conjunction with the identification of potential errors in product data in seller databases 32, content enhancement module 47 may be similarly used to identify potential errors in seller data in seller databases 32 or potential errors in product or seller data in repository 34.

Content enhancement module 47 may be used to identify and/or correct a variety of errors in seller databases 32. For example, these errors may include empty fields in the tables included in a database 32, incomplete product data, incorrect product data, duplicate product data, and any other appropriate errors. These errors may be detected and corrected manually; however, such a process may require a lengthy and expensive review of the contents of each database 32. Furthermore, a manual review process may require a person having domain experience or other expertise relating to the content included in a particular database 32. Content enhancement module 47 reduces or eliminates these problems by providing an automated review of database content based on one or more sets of rules. These rules may include generic rules that apply to most or all databases 32 and/or domain-specific (for example, industry-specific) rules that apply to particular types of content in particular databases 32. Although content enhancement module 47 may not identify and correct all errors in every instance, content enhancement module 47 may significantly reduce or eliminate the need for a manual review.

Rules associated with content enhancement module 47 may be incorporated into software used to implement content enhancement module 47 and/or may be stored in data storage that is accessible by content enhancement module 47. Furthermore, rules may be created, modified, and deleted as appropriate. For example, domain-specific rules may be created as needed as sellers 30 in different industries become associated with GCD 42. As with product and seller data stored in repository 34, domain-specific rules may be created by an entity controlling GCD 42 or by third parties, such as manufacturers, and then used for multiple sellers 30 in a particular industry for which the rules were created. All domain-specific rules may be stored together and content enhancement module 47 may apply all of the rules to all product data. Alternatively, content enhancement module 47 may only apply particular domain-specific rules to product data to which the domain-specific rules may be relevant. For example, domain-specific rules may be associated with particular classes in GCD 42 so that when a seller requests that particular product data in a seller database 32 be associated with a particular class or classes in GCD 42, the domain-specific rules associated with those classes may be applied to the product data.

As mentioned above, content enhancement module 47 may use one or more generic rules. Generic rules may be applied to most, if not all, databases 32 in system 10. For example, a generic rule may state that if a product name or other identifier associated with a particular product is not included in a database 32, then a product identifier should be generated for that product and stored in the database 32 (for example, in a product name field in a table in the database 32). The rule may further state that the product identifier is to be created using the name of a class in which the product is to be categorized along with one or more values of product attributes associated with the product. For example, if the unnamed product is a pen categorized in pens class 58 and having red ink and a broad, felt tip, the following product name may be generated: "pens_red_felt-tip_broad." The components of this class (separated in this example by "_") represent, respectively, a class in which the product is categorized, the value of an ink color attribute associated with the product, the value of a tip type attribute associated with the product, and the value of a tip size attribute associated with the product. Any appropriate class in which a product is categorized and any appropriate attributes may be used to name or otherwise identify a product. In a particular embodiment, the class that is used is the lowest level class in which the product is categorized and the attributes that are used are the "entry-required" attributes. Furthermore, it should be understood that any other appropriate identification scheme may be used.

Another example generic rule may state that if two or more products in a database having the same product name or other identifier have different values for one or more product attributes, then an error exists. Since a particular product identifier should only be associated with one unique set of product data, content enhancement module 47 may in this case notify a user that there is an error. Another example generic rule may state that if two products have the same product data, then those two products should have the same product identifier. If the products do not have the same product identifier, then content enhancement module 47 may notify a user that there is an error. Furthermore, yet another rule may state that if there are two products with the same identifier and product data then there is either an error in the identifier and/or the product data or there is a duplicate entry that should be removed. Content enhancement module 47 may notify a user, such as a seller 30 associated with the database 32, of any of these error conditions. The user may then take corrective action, if appropriate.

Although particular generic rules are described, numerous other appropriate generic rules may be used to identify potential errors in a seller database 32. For example, particular rules may identify commonly used product attributes ("generic" product attributes), such as price, quantity available, and dimensions, that should typically have an associated numerical value as opposed to textual. If a numerical value is not present, then content enhancement module 47 may notify the user of a potential error. Furthermore, various other rules may identify other particular formats that should be used with particular product attributes and content enhancement module 47 may identify potential errors in this manner. Moreover, any other appropriate generic rules may be implemented and all such rules are included in the scope of the present invention.

As mentioned above, another type of rule that content enhancement module 47 may use are domain-specific rules. Domain-specific rules may be created for a particular type of product, industry, or other domain and may also be associated with particular classes in GCD 42. For example, a domain-specific rule associated with automobiles may state that all automobiles in a "compact" class should not have a weight higher than a specified value. Therefore, using such a rule, content enhancement module 47 may determine whether a product associated with or to be associated with the "compact" class has a weight value greater than the specified value. In addition or alternatively, content enhancement module 47 may determine whether an automobile having a value of "compact" for a "size" attribute has an associated weight value greater than the specified value. If any of these conditions occur, then content enhancement module 47 may notify a user of the potential error.

As another example, a domain-specific rule associated with electrical components may state that since all transistors have at least three terminals, if product data associated with a transistor indicates that the transistor has less than three terminals, then there is an error. Furthermore, numerous other types of domain-specific rules may be associated with content enhancement module 47 to identify potentially incorrect data associated with a product based on specific knowledge about the product. Furthermore, content enhancement module 47 may include domain-specific rules similar to generic rules requiring that a particular attribute have a particular type of value. For example, although a "tire size" attribute may not be a common product attribute outside automotive classes in GCD 42 (and thus not have an associated generic rule), a domain-specific rule may be created that states that values associated with the "tire size" attribute should have a numerical value or should have particular alphanumeric format. In addition, countless other domain-specific rules may created and used by content enhancement module 47 and all such rules are included in the scope of the present invention.

Figure 5:
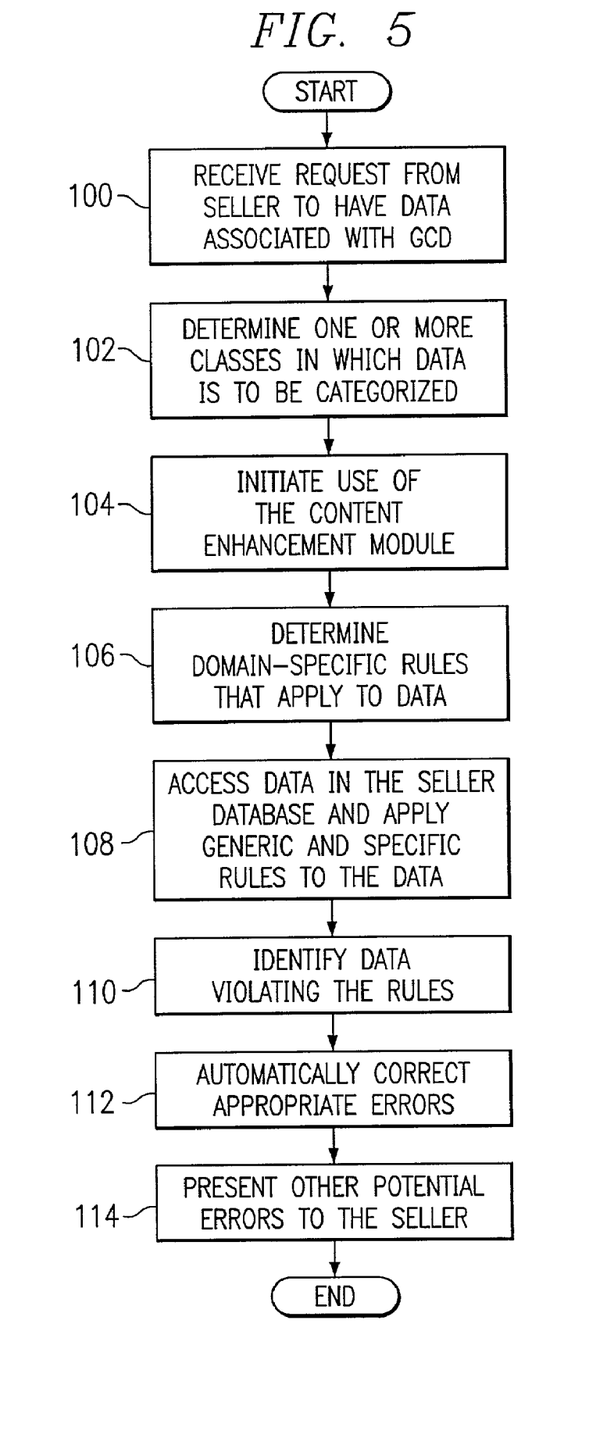
FIG. 5 illustrates an example method for enhancing content in a seller database.

FIG. 5 illustrates an example method for enhancing content in a seller database 32 using content enhancement module 47. In the example method, content enhancement module 47 is initiated automatically upon a seller 30 requesting that content in a seller database 32 be associated with GCD 42. However, the majority of steps in the method are also applicable to the use of content enhancement module 47 in conjunction with content in a seller database 32 that is already associated with GCD 42. Furthermore, although content enhancement module 47 in the example method applies domain-specific rules to the seller database 32 based on the class or classes with which data in seller database 32 is associated, content enhancement module 47 may also apply domain-specific rules based on the industry or industries in which seller 30 is included, based on specific instructions from seller 30 or another appropriate entity, and/or based on any other appropriate criteria. Therefore, content enhancement module 47 may analyze product (and possibly seller data) before that data is categorized into one or more classes of directory structure 44. Moreover, content enhancement module 47 may be independent of GCD server 40 and may be used to analyze data included in seller databases 32 that are a part of system 10 (for example, seller databases 32 for which pointers are not included in GCD 42).

The example method begins at step 100, where GCD server 40 (or an associated component or entity) receives a request from a seller 30 to associate some or all of the seller's product data (and possibly seller data) with GCD 42. The product data is stored in a seller database 32. GCD server 40 or another appropriate component of system 10 determines at step 102 one or more classes in which the product data is to be categorized. Alternatively, the classes may be selected manually by seller 30 or another appropriate entity. At step 104, GCD server 40 initiates the use of content enhancement module 47. This initiation may be performed automatically or upon a request by seller 30. Content enhancement module 47 determines the domain-specific rules that apply to the product data at step 106. For example, content enhancement module 47 may determine the domain-specific rules that are associated with the class or classes into which the product data is categorized and/or other domain-specific rules that may apply (such as industry-specific rules that apply to the product data). Alternatively, the domain-specific rules to be applied may be selected or otherwise manually identified.

At step 108, content enhancement module 47 analyzes the contents of seller database 32 by applying the domain-specific rules identified in step 106, as well as any generic rules, to the contents of database 32. Content enhancement module 47 may apply the rules using any appropriate technique. For example, content enhancement module 47 may sequentially search for data violating each rule or may perform a single search for content violating all applicable rules. Content enhancement module 47 may use the rules to formulate appropriate search queries applicable to each rule. For example, content enhancement module 47 may create a search query of a database 32 including product data for automobiles that requests all automobiles having a value of "compact" for a "size" attribute and having a value greater than "2000" for a "weight" attribute. Such a query may be created for an example domain-specific rule stating that all compact cars should have a weight less than or equal to two thousand pounds. As an alternative to or in addition to communicating search queries to analyze the data in seller database 32, content enhancement module 47 may access and parse through some or all of the data to find data violating one or more of the rules. Furthermore, any other appropriate techniques for applying rules to the product data may be used.

At step 110, content enhancement module 47 identifies data that violates one or more of the rules. This step may be performed by receiving and collecting the results of rule-based queries, as described above, or using any other appropriate technique. Content enhancement module 47 may automatically correct appropriate errors or lack of data at step 112. For example, content enhancement module 47 may generate product names for blank product name fields using an appropriate technique. If content enhancement module 47 cannot correct the error or cannot be sure that there is an error, then content enhancement module 47 presents data violating the applicable rules to seller 30 as potential errors at step 114. In particular embodiments, content enhancement module 47 does not automatically correct many (or any) of the potential errors. Instead, content enhancement module 47 brings these potential errors to the attention of seller 30 or any other appropriate user. Seller 30 may then evaluate the data identified by content enhancement module 47 to determine whether there is an error and to make appropriate corrections to the data as needed. Therefore, content enhancement module 47 may save seller 30 the expensive and time-consuming process of manually searching seller database 32 for errors. Instead, potential errors may be brought to the attention of the seller 30 and seller 30 may focus on particular data in database 32 identified by content enhancement module 47.

Although the present invention has been described with several embodiments, divers changes, substitutions, variations, alterations, and modifications may be suggested to one skilled in the art, and it is intended that the invention encompass all such changes, substitutions, variations, alterations, and modifications falling within the spirit and scope of the appended claims.

What is claimed is:

1. An electronic commerce system, comprising a content enhancement module operable to:
   analyze product data stored in one or more seller databases using a set of rules, the one or more seller databases associated with one or more sellers, the set of rules comprising generic rules applying to substantially all of the one or more seller databases that store product data, the generic rules comprising:
   a first rule indicating that a potential error exists if two products in the one or more seller databases have identical product identifiers but have otherwise different product data;
   a second rule indicating that a potential error exists if two products in the one or more seller databases have different product identifiers but have otherwise identical product data; and
   a third rule indicating that a potential error exists if the values associated with particular generic product attributes have a non-numerical format; and
   identify one or more potential errors in the product data according to the set of rules.

2. The system of claim 1, further comprising:
   a global content directory including a plurality of product classes organized in a hierarchy, each product class categorizing a plurality of products and associated with one or more attributes of the products categorized in the product class, at least one of the product classes having one or more associated pointers that identify one or more seller databases that include product data for one or more products in the class, the product data including values for one or more attributes of the products in the class; and
   a search interface operable to communicate a search query for product data to the one or more seller databases identified by a pointer associated with a product class selected by a user of the global content directory.

3. The system of claim 2, wherein the content enhancement module is operable to perform the analysis and identification in response to the one or more sellers requesting that product data in the one or more seller databases be associated with one or more classes of the global content directory.

4. The system of claim 3, wherein the content enhancement module is operable to perform the analysis using one or more of the rules in the set of rules associated with the particular classes with which the product data is to be associated.

5. The system of claim 2, wherein the generic rules further comprise a fourth rule that generates a product identifier for a product when the product data for that product does not include a product identifier, the generated product identifier comprising the name of a class in which the product is categorized and the values for one or more attributes of the product.

6. The system of claim 1, wherein the content enhancement module is further operable to communicate the potential errors to the one or more sellers associated with the analyzed one or more seller databases.

7. The system of claim 1, wherein analyzing comprises communicating one or more search queries to the one or more seller databases, each search query formulated according to one or more of the rules in the set of rules.

8. The system of claim 7, wherein identifying one or more potential errors comprises identifying product data included in the results of one or more of the search queries.

9. The system of claim 1, wherein analyzing comprises accessing and parsing through the product data included in the one or more seller databases.

10. The system of claim 1, wherein the set of rules further comprise one or more domain-specific rules that apply only to the one or more seller databases including a particular type of product data.

11. The system of claim 10, wherein the domain-specific rules comprise one or more rules from the group consisting of:
    rules indicating that a potential error exists if the value associated with a particular product attribute is outside a specified range of values; and
    rules indicating that a potential error exists if the value associated with a particular product attribute is not in a specified format.

12. A system for content enhancement, comprising:
    means for providing a plurality of users access to an electronic commerce system, the electronic commerce system comprising:
        a global content directory including a plurality of product classes organized in a hierarchy, each product class categorizing a plurality of products and associated with one or more attributes of the products categorized in the product class, at least one of the product classes having one or more associated pointers that identify one or more seller databases that include product data for one or more products in the class, the product data including values for one or more attributes of the products in the class; and
        a search interface operable to communicate a search query for product data to the one or more seller databases identified by a pointer associated with a product class selected by a user of the global content directory;
    means for analyzing the product data stored in the one or more seller databases using a set of rules, the set of rules comprising generic rules applying to substantially all of the one or more seller databases that store product data, the generic rules comprising:
        a first rule indicating that a potential error exists if two products in the one or more seller databases have identical product identifiers but have otherwise different product data;
        a second rule indicating that a potential error exists if two products in the one or more seller databases have different product identifiers but have otherwise identical product data; and
        a third rule indicating that a potential error exists if the values associated with particular generic product attributes have a non-numerical format; and
    means for identifying one or more potential errors in the product data according to the set of rules.

13. An electronic commerce system, comprising:
    a global content directory including a plurality of product classes organized in a hierarchy, each product class categorizing a plurality of products and associated with one or more attributes of the products categorized in the product class, at least one of the product classes having one or more associated pointers that identify one or more seller databases that include product data for one or more products in the class, the product data including values for one or more attributes of the products in the class;
    a search interface operable to communicate a search query for product data to the one or more seller databases identified by a pointer associated with a product class selected by a user of the global content directory; and
    a content enhancement module operable to:
        in response to the one or more sellers requesting that product data in a particular seller database be associated with one or more classes of the global content directory, communicate one or more search queries to the one or more seller databases, the search queries formulated according to rules associated with the particular classes with which the product data in the one or more seller databases is to be associated, the rules comprising:
            a first rule indicating that a potential error exists if two products in the one or more seller databases have identical product identifiers but have otherwise different product data;
            a second rule indicating that a potential error exists if two products in the one or more seller databases have different product identifiers but have otherwise identical product data; and
            a third rule indicating that a potential error exists if the values associated with particular generic product attributes have a non-numerical format;
        identify one or more potential errors in the product data by determining the product data that is included in the results of one or more of the search queries; and
        communicate the potential errors to the one or more sellers associated with the one or more seller databases.

* * * * *